(12) United States Patent
Christensen et al.

(10) Patent No.: US 10,346,188 B1
(45) Date of Patent: Jul. 9, 2019

(54) BOOTING VIRTUAL MACHINE INSTANCES IN A DISTRIBUTED DATA PROCESSING ARCHITECTURE

(71) Applicant: Veritas Technologies LLC, Mountain View, CA (US)

(72) Inventors: Aaron Christensen, Apple Valley, MN (US); Joshua D Kruck, St. Paul, MN (US)

(73) Assignee: Veritas Technologies LLC, Santa Clara, CA (US)

( * ) Notice: Subject to any disclaimer, the term of this patent is extended or adjusted under 35 U.S.C. 154(b) by 0 days.

(21) Appl. No.: 14/303,904

(22) Filed: Jun. 13, 2014

(51) Int. Cl.
| | | |
|---|---|---|
| *G06F 9/50* | (2006.01) | |
| *G06F 9/445* | (2018.01) | |
| *G06F 9/455* | (2018.01) | |
| *H04L 12/911* | (2013.01) | |

(52) U.S. Cl.
CPC .......... *G06F 9/45533* (2013.01); *G06F 9/445* (2013.01); *G06F 9/5077* (2013.01); *H04L 47/70* (2013.01)

(58) Field of Classification Search
None
See application file for complete search history.

(56) References Cited

U.S. PATENT DOCUMENTS

| | | | | |
|---|---|---|---|---|
| 10,108,658 B1 * | 10/2018 | Cole | ................... | G06F 16/2365 |
| 2007/0240160 A1 * | 10/2007 | Paterson-Jones | ..... | G06F 9/5055 |
| | | | | 718/104 |
| 2010/0333116 A1 * | 12/2010 | Prahlad | ............... | G06F 16/1844 |
| | | | | 719/328 |
| 2011/0202928 A1 * | 8/2011 | Nakano | ................. | G06F 9/5011 |
| | | | | 718/104 |
| 2012/0198465 A1 * | 8/2012 | Hande | ................... | G06F 9/5022 |
| | | | | 718/104 |
| 2012/0209886 A1 * | 8/2012 | Henderson | ............ | G06F 16/273 |
| | | | | 707/798 |
| 2013/0067187 A1 * | 3/2013 | Moss | ................... | G06F 3/0689 |
| | | | | 711/170 |

(Continued)

OTHER PUBLICATIONS

Endo et al., "Resource allocation for distributed cloud: concepts and research challenges," Network, IEEE , vol. 25, No. 4, pp. 42-46, Jul.-Aug. 2011.*

(Continued)

*Primary Examiner* — Wei Y Zhen
*Assistant Examiner* — Binh Luu
(74) *Attorney, Agent, or Firm* — Campbell Stephenson LLP

(57) ABSTRACT

VMs are booted in a big data framework within the context of a cluster of computing and storage devices. The big data framework comprises a distributed, location aware file system and a cluster resource manager that assigns computing resources. VM images are stored as data in the distributed file system. Computing resources and hosts are allocated to specific VMs. The allocated hosts are within given levels of proximity to target data. VMs are booted and run on the hosts, and applications are run on the VMs, processing target data in the distributed file system. Prior to booting a given VM, a stored image can be converted between formats. This enables dynamically determining the VM format at boot time, based on what is supported by the hypervisor available on the target host.

22 Claims, 5 Drawing Sheets

(56) References Cited

U.S. PATENT DOCUMENTS

| | | | | |
|---|---|---|---|---|
| 2013/0139154 A1* | 5/2013 | Shah | .................. | G06F 9/45558 718/1 |
| 2013/0212148 A1* | 8/2013 | Koponen | ............ | G06F 9/45558 709/201 |
| 2013/0318525 A1* | 11/2013 | Palanisamy | ........... | G06F 9/5066 718/1 |
| 2014/0047341 A1* | 2/2014 | Breternitz | ............... | G06F 9/505 715/735 |
| 2015/0058843 A1* | 2/2015 | Holler | .................... | G06F 9/455 718/1 |
| 2015/0066646 A1* | 3/2015 | Sriharsha | ........... | G06Q 30/0256 705/14.54 |
| 2015/0121371 A1* | 4/2015 | Gummaraju | ...... | G06F 17/30194 718/1 |
| 2015/0142783 A1* | 5/2015 | Bruce | ............... | G06F 17/30085 707/722 |
| 2016/0320759 A1* | 11/2016 | Macha | .................... | G05B 9/03 |
| 2016/0323377 A1* | 11/2016 | Einkauf | .............. | H04L 67/1076 |

OTHER PUBLICATIONS

McConnell et al., "Towards a SLA-compliant Cloud ResourceAllocator for N-tier Applications" Cloud Computing 2012: The Third International Conference on Cloud Computing, GRIDs, and Virtualization, Jun. 30, 2012, "http://www.thinkmind.org/download.php?articleid=cloud_computing_2012_6_30_20302".*

* cited by examiner

BOOTING VIRTUAL MACHINE INSTANCES IN A DISTRIBUTED DATA PROCESSING ARCHITECTURE

TECHNICAL FIELD

This disclosure pertains generally to big data and virtual machines, and more specifically to booting virtual machine instances in a distributed data processing architecture.

BACKGROUND

A big data framework is a distributed data processing architecture which provides distributed storage for large amounts of data, and facilitates the ability to perform various actions and functionalities concerning the data by bringing the program to the location where the data resides, as opposed to the more traditional model of brining the data to the program. As working data sets become ever larger, this so-called "big data" model makes more and more sense, and is becoming ever more widely used. A big data framework can include an entire collections of components such as a distributed, location-aware file system, a job scheduler, a resource management platform, a coordination service for distributed applications, a scalable, distributed database with support for large tables, etc.

The current canonical example of a big data framework is the Apache™ Hadoop® software library. Hadoop allows for the distributed processing of large data sets across clusters of computers using simple programming models. It is configured to scale-up from single servers to thousands of machines, each offering local computation and storage. Hadoop is designed to detect and handle failures at the application layer, thereby delivering a highly-available service on top of a cluster of computers, each of which may be prone to failures. Although Hadoop is widely deployed today, there are also other big data architectures in use, such as FICO Blaze Advisor, HP Vertica, Splunk, etc.

In the virtualization of computing devices, one or more virtual machines (VMs or guests) can be instantiated at a software level on physical computers (host computers or hosts), such that each VM runs its own operating system instance. Just as software applications can be run on physical computers, so too can applications be run on virtual machines. In some virtualization scenarios, a software component often called a hypervisor can act as an interface between the VMs and the host operating system for some or all of the functions of the VMs. In those situations, the hypervisor acts as an interface between the VMs and the hardware of the host computer, in effect functioning as the host operating system, on top of which the VMs run. Even where a host operating system is present, the hypervisor sometimes interfaces directly with the hardware for certain services. Different virtualization platforms run on different host hardware and provide virtualization utilizing different hypervisors configured to support varying virtualization capabilities for VM images in different formats. Under a given virtualization platform (e.g., VMware, Microsoft Hyper-V, VirtualBox, etc.), a VM in a format supported by the platform can be brought up on an underlying host running the platform's a hypervisor.

SUMMARY

A big data VM image management system boots VMs in a big data framework implemented within the context of a cluster of computing and storage devices. The big data framework comprises a distributed, location aware file system that provides redundant storage of large data sets and a cluster resource manager that assigns computing resources to schedule and run specific applications. In one embodiment, the big data framework is in the form Apache Hadoop, the distributed, location aware file system comprises Apache Hadoop Distributed File System (HDFS) and the cluster resource manager comprises Apache Hadoop YARN.

VM images are stored as data in the distributed, location-aware file system of the big data framework. Computing resources are allocated to specific VMs from an available pool, in conjunction with the cluster resource manager of the big data framework. Corresponding hosts within the cluster are allocated to specific VMs, on which to boot and run the VMs within the big data framework. The allocated hosts are within given levels of proximity to target data to be acted on by applications to be run on the specific VMs.

The specific VMs are booted on the corresponding hosts, for example in response to received user directives. The VMs run on the hosts, and utilize the allocated computing resources. Specific applications are run on the various VMs, and process the target data in the distributed, location-aware file system of the big data framework. Different applications can be simultaneously run on separate VMs, wherein the different applications process data in the distributed, location-aware file system of the big data framework in different ways (for example batch, interactive, online, streaming, in-memory, etc.). VMs run until being shutdown, for example in response attempting to use more resources than allocated, a VM operating system level shutdown command or a big data VM image management system level shutdown. Given VMs can be booted multiple times, to perform a given task on given data, or otherwise.

In some embodiments, prior to booting a given VM, a stored image is converted from a first format in which the image is stored to a second format that is supported by the hypervisor on the given corresponding host. The VM in the second format is then booted on the host. This enables dynamically determining the VM format at boot time, based on what is supported by the hypervisor available on the target host. In one embodiment, VM images are stored in the distributed, location-aware file system by performing a backup of a virtualization platform, in which the distributed file system is used as the storage target for the backup image. In another embodiment, lifecycle events of VMs are tracked, using analytics tools native to the big data framework. The analytics tools can then be used to provide notifications of the tracked lifecycle events.

The features and advantages described in this summary and in the following detailed description are not all-inclusive, and particularly, many additional features and advantages will be apparent to one of ordinary skill in the relevant art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

The Figures depict various embodiments for purposes of illustration only. One skilled in the art will readily recognize from the following discussion that alternative embodiments of the structures and methods illustrated herein may be employed without departing from the principles described herein.

DETAILED DESCRIPTION

Figure 1:
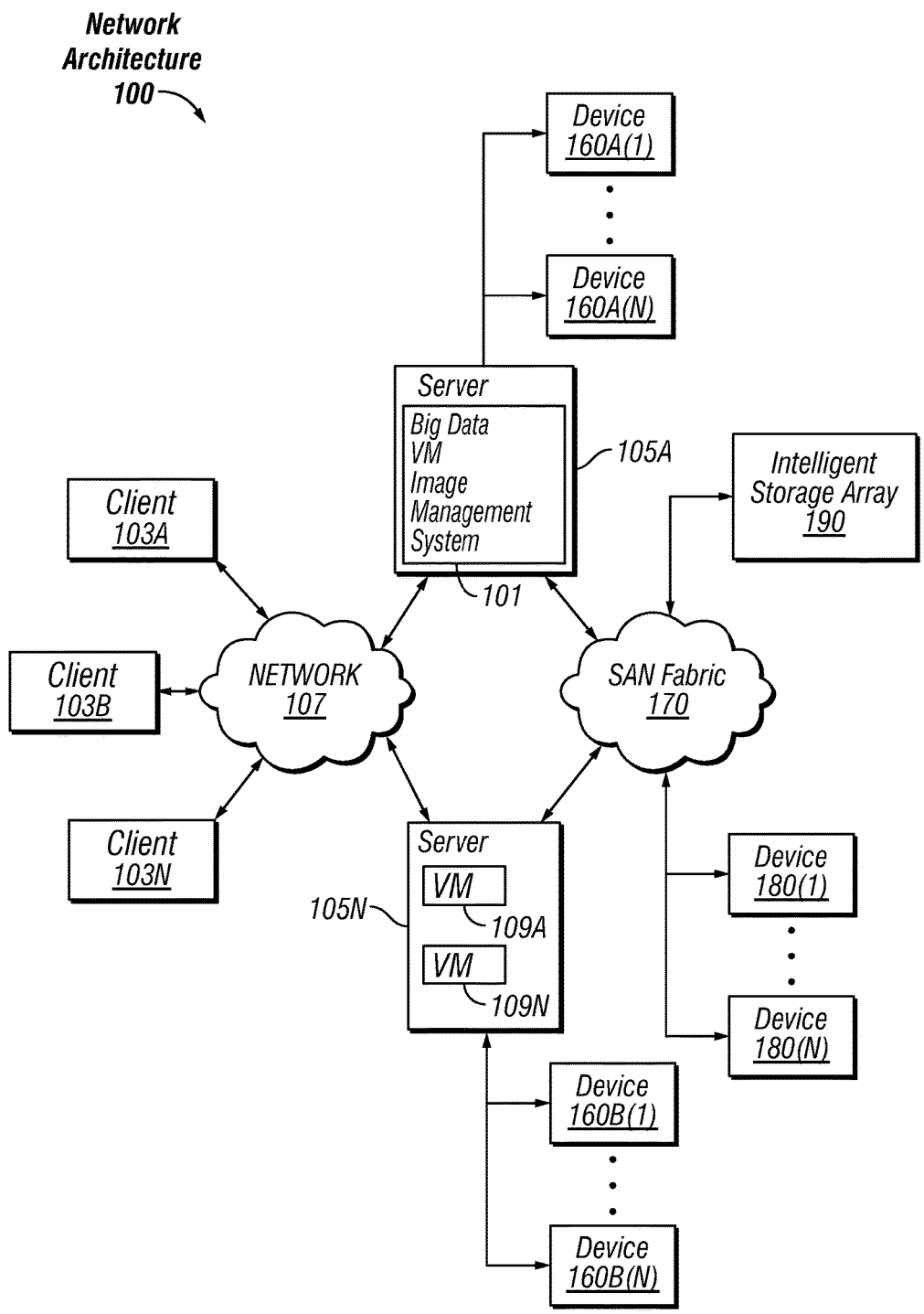
FIG. 1 is a block diagram of an exemplary network architecture in which a big data VM image management system can be implemented, according to some embodiments.

FIG. 1 is a block diagram illustrating an exemplary network architecture 100 in which a big data VM image management system 101 can be implemented. In the illustrated network architecture 100, client systems 103A, 103B and 103N, as well as servers 105A and 105N, are communicatively coupled to a network 107. A big data VM image management system 101 is illustrated as residing on server 105A, but it is to be understood that in different embodiments the big data VM image management system 101 can reside on different computers 210, or be distributed between multiple computing systems as desired. VMs 109A-109N are illustrated as running on server 105N, but again this is just an example and in practice more (or fewer) VMs 109 can run on multiple computing devices as described in more detail below. In FIG. 1, server 105A is further depicted as having storage devices 160A(1)-(N) directly attached, and server 105N is depicted with storage devices 160B(1)-(N) directly attached. Servers 105A and 105N are also connected to a SAN fabric 170 which supports access to storage devices 180(1)-(N) by servers 105A and 105N, and so by client systems 103A-N via network 107. Intelligent storage array 190 is also shown as an example of a specific storage device accessible via SAN fabric 170. In other embodiments, shared storage is implemented using FC and iSCSI (not illustrated) instead of (or in combination with) a SAN fabric 170.

Many different networking technologies can be used to provide connectivity from each of client computer systems 103A-N to network 107. Some examples include: LAN, WAN and various wireless technologies. Client systems 103A-N are able to access applications and/or data on server 105A or 105N using, for example, a web browser or other client software (not shown). This enables client systems 103A-N to run applications from an application server 105 and/or to access data hosted by a storage server 105 or one of storage devices 160A(1)-(N), 160B(1)-(N), 180(1)-(N) or intelligent storage array 190. Clients 103 can be in the form of, for example, desktop computers, laptop computers, or handheld or wearable mobile computing devices, comprising portable computer systems capable of connecting to a network 107 and running applications.

Although FIG. 1 illustrates three clients 103A-N and two servers 105A-N as an example, in practice many more (or fewer) computers can be deployed. In one embodiment, the network 107 is in the form of the internet. Other networks 107 or network-based environments can be used in other embodiments.

Figure 2:
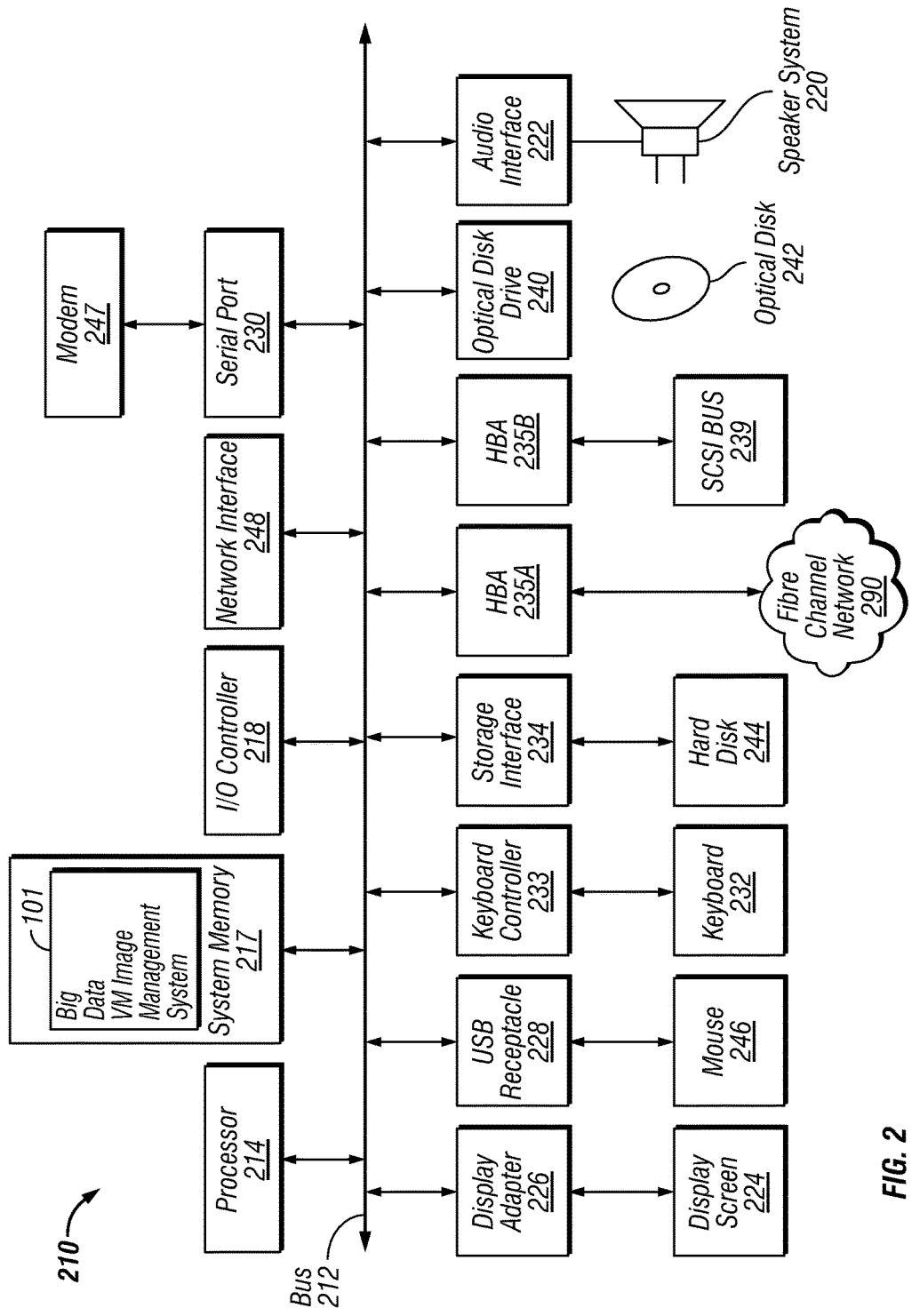
FIG. 2 is a block diagram of a computer system suitable for implementing a big data VM image management system, according to some embodiments.

FIG. 2 is a block diagram of a computer system 210 suitable for implementing a big data VM image management system 101. Both clients 103 and servers 105 can be implemented in the form of such computer systems 210. As illustrated, one component of the computer system 210 is a bus 212. The bus 212 communicatively couples other components of the computer system 210, such as at least one processor 214, system memory 217 (e.g., random access memory (RAM), read-only memory (ROM), flash memory, an input/output (I/O) controller 218, an audio output interface 222 communicatively coupled to an audio output device such as a speaker 220, a display adapter 226 communicatively coupled to a video output device such as a display screen 224, one or more interfaces such as Universal Serial Bus (USB) ports 228, serial ports 230, parallel ports (not illustrated), etc., a keyboard controller 233 communicatively coupled to a keyboard 232, a storage interface 234 communicatively coupled to one or more hard disk(s) 244 (or other form(s) of storage media), a host bus adapter (HBA) interface card 235A configured to connect with a Fibre Channel (FC) network 290, an HBA interface card 235B configured to connect to a SCSI bus 239, an optical disk drive 240 configured to receive an optical disk 242, a mouse 246 (or other pointing device) coupled to the bus 212, e.g., via a USB port 228, a modem 247 coupled to bus 212, e.g., via a serial port 230, and one or more wired and/or wireless network interface(s) 248 coupled, e.g., directly to bus 212.

Other components (not illustrated) may be connected in a similar manner (e.g., document scanners, digital cameras, printers, etc.). Conversely, all of the components illustrated in FIG. 2 need not be present (e.g., smartphones and tablets typically do not have optical disk drives 240, external keyboards 242 or external pointing devices 246, although various external components can be coupled to mobile computing devices via, e.g., USB ports 228). In different embodiments the various components can be interconnected in different ways from that shown in FIG. 2.

The bus 212 allows data communication between the processor 214 and system memory 217, which, as noted above may include ROM and/or flash memory as well as RAM. The RAM is typically the main memory into which the operating system and application programs are loaded. The ROM and/or flash memory can contain, among other code, the Basic Input-Output system (BIOS) which controls certain basic hardware operations. Application programs can be stored on a local computer readable medium (e.g., hard disk 244, optical disk 242, flash memory) and loaded into system memory 217 and executed by the processor 214. Application programs can also be loaded into system memory 217 from a remote location (i.e., a remotely located computer system 210), for example via the network interface 248. In FIG. 2, the big data VM image management system 101 is illustrated as residing in system memory 217. The workings of the big data VM image management system 101 are explained in greater detail below in conjunction with FIG. 3.

The storage interface 234 is coupled to one or more hard disks 244 (and/or other standard storage media). The hard disk(s) 244 may be a part of computer system 210, or may be physically separate and accessed through other interface systems.

The network interface 248 and/or modem 247 can be directly or indirectly communicatively coupled to a network 107 such as the internet. Such coupling can be wired or wireless.

Figure 3:
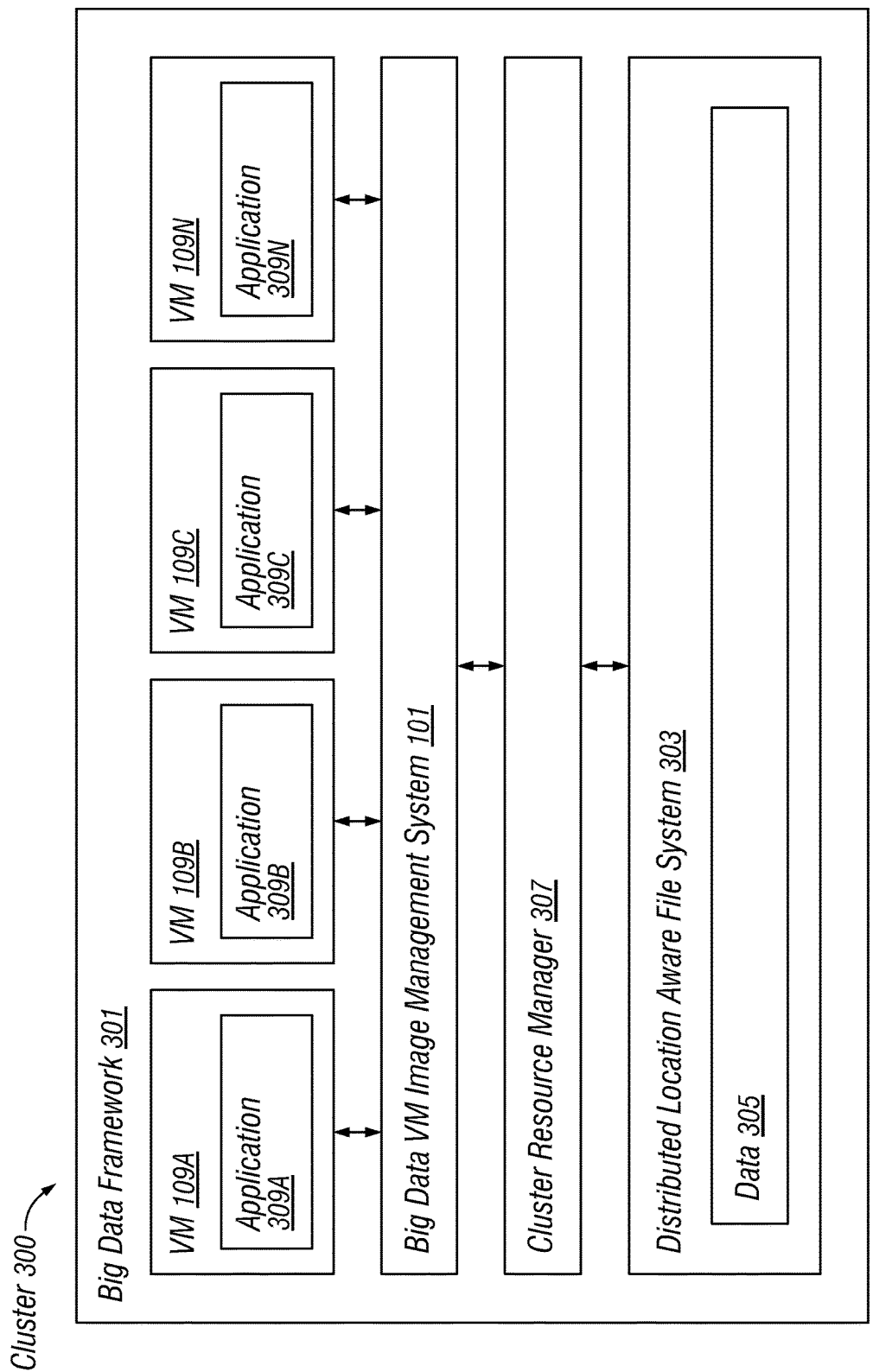
FIG. 3 is a high level block diagram of the operation of a big data VM image management system within a high availability cluster, according to some embodiments.

FIG. 3 shows a big data framework 301 implemented within the context of a cluster 300 of computing and storage devices. The cluster 300 can be distributed across multiple physical sites, and can contain components of the type illustrated in FIG. 1. FIG. 3 illustrates the big data VM image management system 101 as a centralized component within the big data framework 301. It is to be understood that in different embodiments, the functionalities of the big data VM image management system 101 can reside on a server 105, client 103, or be distributed between multiple computer systems 210, including within a cloud-based computing environment in which the functionality of the big data VM image management system 101 is provided as a service over a network 107.

It is to be understood that although a big data VM image management system 101 is illustrated in FIG. 3 as a single entity, the illustrated big data VM image management system 101 represents a collection of functionalities, which can be instantiated as a single or multiple modules as desired. It is to be understood that the modules of the big data VM image management system 101 can be instantiated (for example as object code or executable images) within the system memory 217 (e.g., RAM, ROM, flash memory) of any computer system 210, such that when at least one processor 214 of the computer system 210 processes a module, the computer system 210 executes the associated functionality. As used herein, the terms "computer system," "computer," "client," "client computer," "server," "server computer" and "computing device" mean one or more computers configured and/or programmed to execute the described functionality. Additionally, program code to implement the functionalities of the big data VM image management system 101 can be stored on computer-readable storage media, such that when the program code is loaded into computer memory 217 and executed by at least one processor 214 of the computer system 210, the computer system 210 executes the associated functionality. Any form of non-transitory computer readable medium can be used in this context, such as magnetic or optical storage media. As used herein, the term "computer readable medium" does not mean an electrical signal separate from an underlying physical medium.

One component of the big data framework 301 of FIG. 3 is a distributed, location-aware file system 303 which provides redundant, reliable data storage, including storage of large data sets 305 (e.g., multiple terabytes, petabytes, exabytes, etc.). The distributed, location-aware file system 303 stores multiple copies of the data sets 305 across multiple, physical (and/or logical) storage devices, often located in multiple racks, at multiple physical sites, etc. The distributed file system 303 is location aware in the sense that it tracks not only the locations on specific media on which files are stored (e.g., at a sector or offset level), but the physical locations at which media storing copies of the data 305 reside (e.g., at a rack or network switch level). In one embodiment, Apache Hadoop Distributed File System (HDFS) is used as the distributed, location-aware file system 303, but other implementation options are used in other embodiments. Although the distributed, location-aware file system 303 is illustrated in FIG. 3 as a single entity, it is to be understand that in practice the distributed, location-aware file system 303 would typically be distributed across multiple computing and storage devices within the cluster 300.

Also present in the big data framework 301 is a cluster resource manager 307. The cluster resource manager 307 manages the computing resources of the devices in the cluster 300, assigning resources to schedule and run specific applications 309 within the big data framework 301. This enables multiple applications 309 to run simultaneously in the big data framework 301, processing the data 305 and utilizing the computing resources of the cluster 300. Thus, the data 305 is stored and managed by the distributed, location-aware file system 303, while the cluster resource manager 307 provides predictable performance and quality of services guarantees to multiple applications 309 interacting with the data 305 of the big data framework 301, e.g., with the applications 309 running where the data 305 is as opposed to the data 305 being brought to the applications 309. In one embodiment Apache Hadoop YARN is used as the cluster resource manager 307, but other platforms can be used in other embodiments.

Multiple applications 309 can be run on and scheduled by the cluster resource manager 307. The different applications 309 run natively in the big data framework 301, within the context of different tools and modules available therein. The different applications 309 process data 305 in different ways, e.g., batch, interactive, online, streaming, in-memory, etc. For example, as noted above in one specific embodiment Apache Hadoop is used as the underlying big data framework 301. Within this context, a large number of Hadoop native modules that run on YARN are available. Examples include Apache Hadoop MapReduce (an execution engine that runs applications 309 processing large data sets 305 in batch mode), Apache Tez (a generalized interactive dataflow programming framework, built on Hadoop YARN), HBase (a scalable, distributed online database that supports structured data storage for large tables), Apache Spark (a fast, in-memory general compute engine for Hadoop data 305), Apache Giraph (an iterative graph processing system built for high scalability), Apache S4, Apache Samza and Apache Storm (three different programs for processing large data streams), Apache Hama (a Bulk Synchronous Parallel (BSP) processing engine for advanced analytics and such) and others. Leveraging this rich environment in which a variety of applications 309 can be run natively in a big data framework 301 and interact with the large data sets 305 in a variety of different ways, the big data VM image management system 101 further adds value by enabling the deployment of VMs 109 on the fly within the big data framework 301. Different applications 309 can then be run on these VMs 109 as described in more detail below. It is to be understood that although FIG. 3 illustrates applications 309A-N running on VMs 109A-N, this is an example only and more or fewer applications can be deployed on more or fewer VMs 109 in different embodiments.

Figure 4:
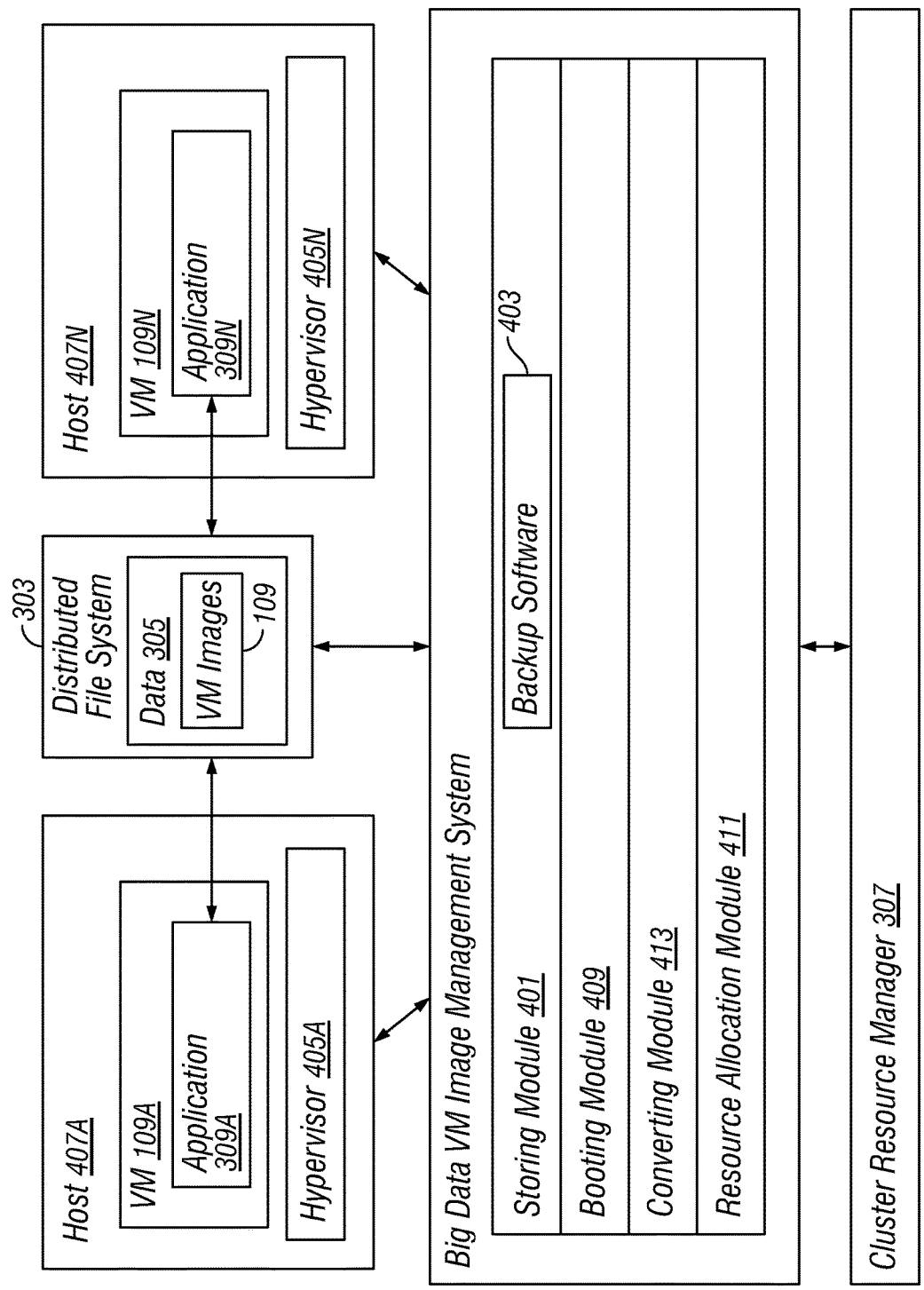
FIG. 4 is a block diagram of the operation of the functional modules of a big data VM image management system, according to some embodiments.

Turning to FIG. 4, the operation of specific functional modules of a big data VM image management system 101 is illustrated, according to some embodiments. A storing module 401 of the big data VM image management system 101 stores images of VMs 109 as data 305 in the distributed, location-aware file system 303 of the big data framework 301 (for example, in HDFS). VM images 109 can be stored in different formats as desired, such as VMware vmdk, VirtualBox vdi, QEMU qcow2, etc. As described in greater detail below, in some embodiments stored VM images 109 are converted into optimal formats at boot time based on the available hypervisor(s) 405 on the target host(s) 407.

A booting module 409 of the big data VM image management system 101 can retrieve specific VM images 109 and start up the VMs 109 on target hosts 407 within the cluster 300. The booting of a specific VM 109 can occur in response to a directive received from a user (e.g., through an API exposed by the big data VM image management system 101 or through a GUI), can be part of an automated workflow, can be based on a preconfigured schedule, etc. As part of the VM start up process, a resource allocating module 411 of the big data VM image management system 101 utilizes the cluster resource manager 307 (e.g., YARN) to allocate computing resources such as CPU and memory to the VM 109 from the pool of available resources managed by the cluster resource manager 307. The resource allocating module 411 also utilizes the cluster resource manager 307 to allocate a specific host 407 within the cluster 300 on which the VM 109 is to be booted and run. At least some of the other computing resources allocated to a given VM 109 are on the specific, corresponding host 407 (e.g., CPU), but other allocated resources can be external to the corresponding host 407 and/or distributed (e.g., storage).

What specific computing resources to allocate to a specific VM 109 can be determined based on the priority and/or needs of the application(s) 409 to be run on the VM 109, as well as the availability of computing resources balanced against those assigned and/or reserved for other applications 409. The specific host 407 within the cluster 300 on which to boot a specific VM 109 is also determined based on availability and the nature of the application(s) 409 to be run on the VM 109, including proximity to the target data 305. Note that because the cluster resource manager is a native component of the big data framework running in coordination with the location-aware file system 303, the VM 109 can be booted on a host 407 which is within a desired, given level of proximity to the target data 305 to be acted on by the running VM 109. The specific level of proximity can vary between embodiments according to the circumstances (e.g., the nature of the application 407 to be run on the VM 109 and/or the target data 305, the availability of hosts 407, the demands and priorities of other VMs 109 and applications 409, etc.). The boot module 409 accesses the VM image 109 from the location-aware file system 303, and boots the VM 109 on the assigned host 407, where it runs while consuming the assigned computing resources.

As noted above, in some embodiments a converting module 413 of the big data VM image management system 101 converts the VM image 109 into an optimal target format before booting. In other words, the target format of a VM 109 can be determined dynamically at boot time, based on the best (or only) format supported by the hypervisor(s) 405 available on the host 407 on which the VM 109 is to be brought up. In some instances, more than one hypervisor 405 is available, or a single available hypervisor 405 supports multiple formats. In these scenarios in which a choice of VM formats is available, the big data VM image management system 101 selects a format considered optimal, either for the specific job to be performed by the VM 109, or in general. This selection can be made as a function of different factors in different embodiments, such as a preconfigured table, administrator entered parameters, a correspondence between the requirements of the application 409 to be run on the VM 109 and the capabilities of the format, etc. The specific factors to utilize in the selection of optimal VM format choices is a variable design parameter which can be configured differently in different embodiments as desired.

Once the selection is made from the choices available, the converting module 413 converts the stored VM image 109 into the target format, unless the image 109 is stored in the target format already in which case no conversion is needed. Where only a single format is supported by the target host 407, the stored VM image 109 is converted into the supported format (if it is not already in the supported format). Thus, the big data VM image management system 101 has the ability to accept a VM image 109 in a format that is not used by the hypervisor 405 on the host 407, and convert the VM image format to one usable by the target hypervisor 405 at run time.

The big data VM image management system enables VMs 109 to be converted from stored images 109 into any format, and run within the context of the big data framework 301 on resources allocated by the cluster resource manager 307 (e.g., YARN), against data 305 sourced from the distributed, location-aware file system 303 (e.g., HDFS), on hosts 407 near where the data 305 is located. Big data framework native components and tools can then be run on the VMs 109 near the target data 305 for any purpose (e.g., NoSQL database, stream processing, graphs, interactive queries, search/index, in-memory database, etc). Once started, a VM 109 can run until it is shutdown, for example because it attempts to use more resources than assigned, or in response to an administrator using its OS shutdown commands or performing a hard shutdown using an API exposed by the big data VM image management system 101. A single VM image 109 can be booted multiple times, as desired. Where the VM 109 is being booted multiple times to perform the same task on the same data 305, it may be rebooted in the same location, which can result in the side benefit of a pre-warmed cache.

In one embodiment, backup software 403 is optionally used to seed the distributed, location-aware file system 303 with VM images 109. More specifically, the backup software 403 can be used to perform a backup of a virtualization platform, using the distributed, location-aware file system 303 as a storage target for the backup image. The big data VM image management system 101 can subsequently poll an appropriate directory in the distributed, location-aware file system 303 for new backup images, or the backup software 403 can be configured to notify the big data VM image management system 101 whenever a new backup image has been placed in the distributed, location-aware file system 303. In another embodiment, VM images 109 can be stored in a third party VM template/image management application (not illustrated). In this embodiment, the VM images 109 can be moved from the third party system into the big data framework 301. In other words, rather than choosing to access the distributed file system 303 to get the image 109, the big data VM image management system 101 could pull the image out of a third party application, purpose built for storing VM images 109, such as OpenStack's Glance project. The big data VM image management system 101 would still allocate resources for the VM 109 and run it on an assigned host 407. When booting a VM 109 on a host 407 in the cluster 300, the big data VM image management system 101 could first pull the image from the third party service and transfer it to the assigned host 407 before converting and/or starting it. This would enable the big data VM image management system 101 to inform the decision concerning which host to assign to the VM 109, based on, e.g., physical proximity to target data 305. It is to be understood that Glance, which provides services from storing, discovering, registering and retrieving VM images 109, is only an example of a specific third party system that can be used in this capacity. Other third party applications are used in other embodiments as desired.

Note further that because the VM instances are in the form of data 305 within the big data framework 301, the framework native analytics tools can be used to track and analyze the lifecycle of the VMs 109. For example, in a Hadoop based embodiment, Apache Zookeeper can be used to track and provide notifications concerning the lifecycle events of a VM image 109. ZooKeeper is a centralized service for maintaining configuration information, naming and synchronization within large distributed systems. Zookeeper can be configured to track and report VM image lifecycle events such as request for boot, beginning of the start-up process, VM actively running on a given host, request for shutdown, VM no longer running, etc. In a similar manner, the lifecycle of the image conversion process can also be tracked and reported. The lifecycle events of interest in a VM image conversion can be, e.g., request to convert the image, start of the conversion, incremental status updates, conversion completion, etc. The exact analytic information to track and report is a variable design parameter. In any case, the big data VM image management system 101 can store this information for future analysis, provide notifications or generate reports concerning this information for administrators, etc.

The big data VM image management system 101 enables distributed, data intensive applications 309 to be run on VMs 109 deployed to take advantage of data locality in a big data framework 301. These applications 309 can be run in a resource coordinated environment, taking full advantage of the native tools and components of the big data framework 301.

Figure 5:
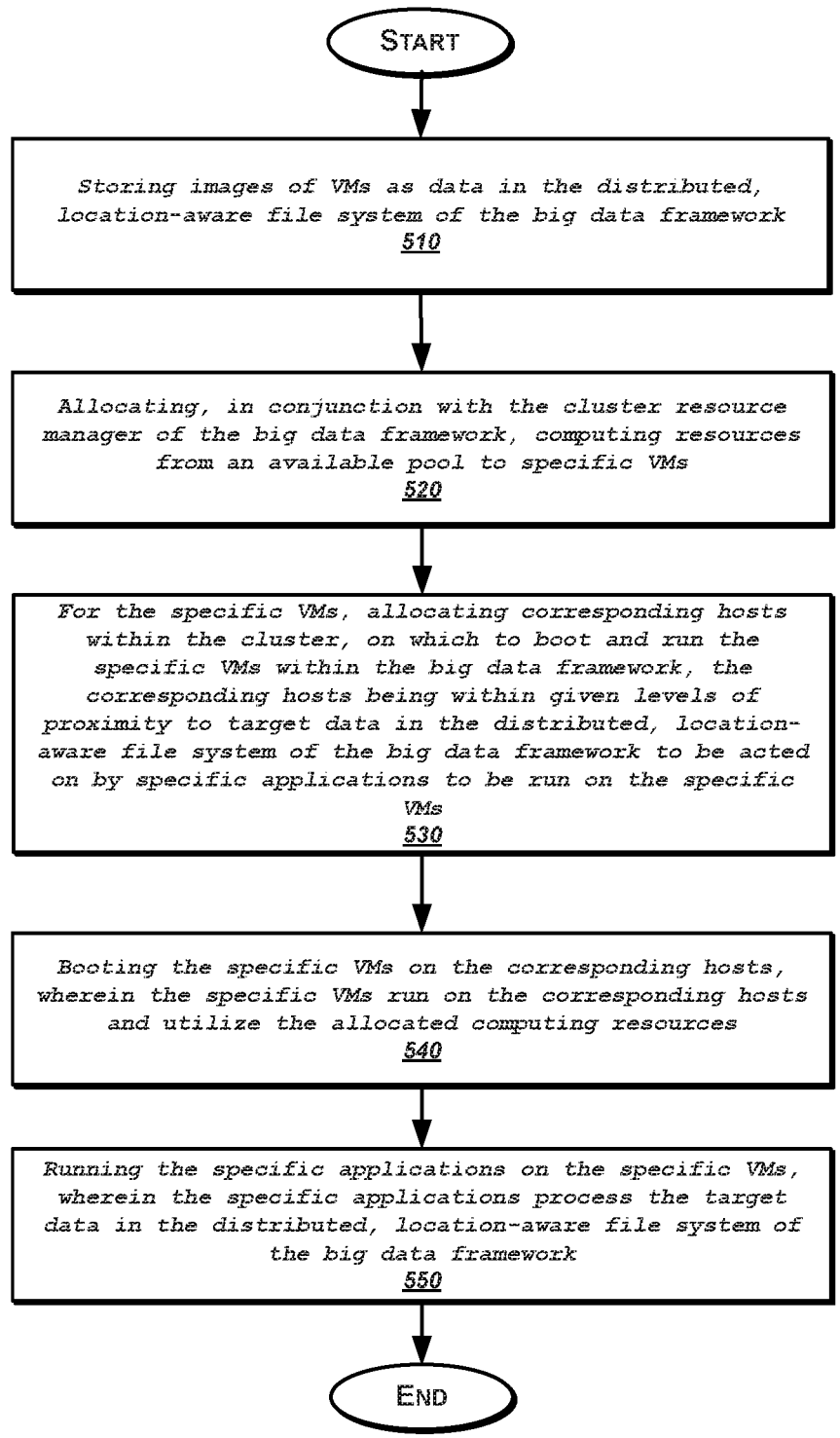
FIG. 5 is a flow chart illustrating a method operating in a big data VM image management system, according to some embodiments.

FIG. 5 is a flow chart illustrating a method 500 of a big data VM image management system, according to some embodiments. Method 500 includes: storing images of VMs as data in the distributed, location-aware file system of the big data framework (step 510); allocating, in conjunction with the cluster resource manager of the big data framework, computing resources from an available pool to specific VMs (step 520); for the specific VMs, allocating corresponding hosts within the cluster, on which to boot and run the specific VMs within the big data framework, the corresponding hosts being within given levels of proximity to target data in the distributed, location-aware file system of the big data framework to be acted on by specific applications to be run on the specific VMs (step 530); booting the specific VMs on the corresponding hosts, wherein the specific VMs run on the corresponding hosts and utilize the allocated computing resources (step 540); and running the specific applications on the specific VMs, wherein the specific applications process the target data in the distributed, location-aware file system of the big data framework (step 550).

As will be understood by those familiar with the art, the invention may be embodied in other specific forms without departing from the spirit or essential characteristics thereof. Likewise, the particular naming and division of the portions, modules, agents, managers, components, functions, procedures, actions, layers, features, attributes, methodologies, data structures and other aspects are not mandatory or significant, and the mechanisms that implement the invention or its features may have different names, divisions and/or formats. The foregoing description, for purpose of explanation, has been described with reference to specific embodiments. However, the illustrative discussions above are not intended to be exhaustive or limiting to the precise forms disclosed. Many modifications and variations are possible in view of the above teachings. The embodiments were chosen and described in order to best explain relevant principles and their practical applications, to thereby enable others skilled in the art to best utilize various embodiments with or without various modifications as may be suited to the particular use contemplated.

What is claimed is:

1. A method comprising:
storing a plurality of images in a distributed file system, wherein
the distributed file system comprises a plurality of storage units,
each of the plurality of images is an image of one of a plurality of virtual machines (VMs),
a target data set is associated with a first VM of the plurality of VMs,
the target data set comprises one or more redundant copies of data associated with the first VM, and
the target data set is distributed across a plurality of the plurality of storage units;
allocating one or more computing resources, from an available pool of computing resources, to the first VM;
identifying at least two storage units in which the target data set is stored, wherein
the at least two storage units are identified from among the plurality of storage units, and
each of the at least two storage units stores a portion of the target data set but not all of the target data set;
selecting a corresponding host that has an acceptable level of physical proximity to the at least two storage units, wherein
the corresponding host is selected from a plurality of hosts, and
the acceptable level of physical proximity is based, at least in part, on one or more requirements of one or more applications that are to be executed on the first VM;
assigning the first VM to the corresponding host;
booting the first VM on the corresponding host, wherein
booting the first VM comprises loading the one or more applications on the first VM; and
executing the one or more applications on the first VM, wherein
the executing the one or more applications comprises processing the target data set by accessing both of the at least two storage units in which the target data set is stored.

2. The method of claim 1 further comprising:
prior to the booting the first VM, converting an image of the first VM from a first format in which the image is stored to a second format; and
booting the first VM in the second format on the corresponding host, wherein a hypervisor on the corresponding host supports VMs in the second format.

3. The method of claim 2 further comprising:
dynamically determining the second format at boot time, wherein
the dynamically determining comprises
identifying one or more formats of images of VMs supported by the hypervisor on the corresponding host.

4. The method of claim 1 wherein the booting the first VM further comprises:
booting the first VM in response to one or more instructions received from a user.

5. The method of claim 1 further comprising:
shutting down the first VM executing on the corresponding host in response to an event from a group of events comprising at least one of the following:

the first VM attempting to utilize more resources than it was allocated;
a shutdown command of an operating system running on the first VM; or
an application programming interface (API) shutdown.

6. The method of claim 1 further comprising:
performing a given task on the target data set, wherein the performing comprises booting the first VM multiple times.

7. The method of claim 1, further comprising
booting one or more VMs on the corresponding host; and
executing a plurality of applications on the one or more VMs, wherein
each application of the plurality of applications processes the target data set differently from at least one other application of the plurality of applications.

8. The method of claim 1, wherein the storing the plurality of images of VMs in the distributed file system further comprises:
performing a backup of a virtualization platform, using the distributed file system as a storage target for a backup image.

9. The method of claim 1 further comprising:
tracking lifecycle events of the first VM, using an analytics tool native to a big data framework; and
providing notifications of the lifecycle events.

10. The method of claim 1, wherein
the selecting the corresponding host is further based on one or more operational characteristics of the corresponding host, wherein
the one or more operational characteristics comprise at least one of:
communication bandwidth between the at least two storage units and the corresponding host,
processing capabilities of each of the corresponding host,
availability of one or more potential hosts from the plurality of hosts,
a characteristic of the one or more applications, and
a characteristic of the target data set.

11. The method of claim 10, wherein
the selecting the corresponding host is further based, at least in part, on a level of performance provided by the corresponding host.

12. The method of claim 1, further comprising:
storing one or more images of VMs in a dedicated third party image management application; and
prior to the booting the first VM on the corresponding host, transferring an image of the first VM to the corresponding host.

13. A non-transitory computer-readable storage medium storing program instructions executable to:
store a plurality of images in a distributed file system, wherein
the distributed file system comprises a plurality of storage units,
each of the plurality of images is an image of one of a plurality of virtual machines (VMs),
a target data set is associated with a first VM of the plurality of VMs,
the target data set comprises one or more redundant copies of data associated with the first VM, and
the target data set is distributed across a plurality of the plurality of storage units;
allocate one or more computing resources, from an available pool of computing resources, to the first VM;
identify at least two storage units in which the target data set is stored, wherein
the at least two storage units are identified from among the plurality of storage units, and
each of the at least two storage units stores a portion of the target data set but not all of the target data set;
select a corresponding host that has an acceptable level of physical proximity to the at least two storage units, wherein
the corresponding host is selected from a plurality of hosts, and
the acceptable level of physical proximity is based, at least in part, on one or more requirements of one or more applications that are to be executed on the first VM;
assign the first VM to the corresponding host;
boot the first VM on the corresponding host, wherein
booting the first VM comprises loading the one or more applications on the first VM; and
execute the one or more applications on the first VM, wherein
executing the one or more applications comprises processing the target data set by accessing both of the at least two storage units in which the target data set is stored.

14. The non-transitory computer-readable storage medium of claim 13, wherein the instructions are further executable to:
prior to booting the first VM, convert an image of the first VM from a first format in which the image is stored to a second format; and
boot the first VM in the second format on the corresponding host, wherein a hypervisor on the corresponding host supports VMs in the second format.

15. The non-transitory computer-readable storage medium of claim 14, wherein the instructions are further executable to:
dynamically determine the second format at boot time, wherein
dynamically determining comprises
identifying one or more formats of images of VMs supported by the hypervisor on the corresponding host.

16. The non-transitory computer-readable storage medium of claim 13, wherein the instructions are further executable to:
shut down the first VM executing on the corresponding host in response to an event from a group of events comprising at least one of the following:
the first VM attempting to utilize more resources than it was allocated;
a shutdown command of an operating system running on the first VM; or
an application programming interface (API) shutdown.

17. The non-transitory computer-readable storage medium of claim 13, wherein the instructions are further executable to:
perform a given task on the target data set, wherein
performing the given task comprises booting the first VM multiple times.

18. The non-transitory computer-readable storage medium of claim 13, wherein the instructions are further executable to:
boot one or more VMs on the corresponding host; and
execute a plurality of applications on the one or more VMs, wherein each application of the plurality of applications processes the target data set differently from at least one other application of the plurality of applications.

19. The non-transitory computer-readable storage medium of claim 13, wherein storing the plurality of images of VMs in the distributed file system further comprises:
performing a backup of a virtualization platform, using the distributed file system as a storage target for a backup image.

20. The non-transitory computer-readable storage medium of claim 13, wherein the instructions are further executable to:
track lifecycle events of the first VM, using an analytics tool native to a big data framework; and
provide notifications of the lifecycle events.

21. The non-transitory computer-readable storage medium of claim 13, wherein
selecting the corresponding host is further based on one or more operational characteristics of the corresponding host, wherein
the one or more operational characteristics comprise at least one of:
communication bandwidth between the at least two storage units and the corresponding host,
processing capabilities of each of the corresponding host,
availability of one or more potential hosts from the plurality of hosts,
a characteristic of the one or more applications, and
a characteristic of the target data set.

22. A system comprising:
one or more processors; and
a memory coupled to the one or more processors, wherein the memory stores program instructions executable by the one or more processors to:
store a plurality of images in a distributed file system, wherein
the distributed file system comprises a plurality of storage units,
each of the plurality of images is an image of one of a plurality of virtual machines (VMs),
a target data set is associated with a first VM of the plurality of VMs,
the target data set comprises one or more redundant copies of data associated with the first VM, and
the target data set is distributed across a plurality of the plurality of storage units;
allocate one or more computing resources, from an available pool of computing resources, to the first VM;
identify at least two storage units in which the target data set is stored, wherein
the at least two storage units are identified from among the plurality of storage units, and
each of the at least two storage units stores a portion of the target data set but not all of the target data set;
select a corresponding host that has an acceptable level of physical proximity to the at least two storage units, wherein
the corresponding host is selected from a plurality of hosts, and
the acceptable level of physical proximity is based, at least in part, on one or more requirements of one or more applications that are to be executed on the first VM;
assign the first VM to the corresponding host;
boot the first VM on the corresponding host, wherein
booting the first VM comprises loading the one or more applications on the first VM; and
execute the one or more applications on the first VM, wherein
executing the one or more applications comprises processing the target data set by accessing both of the at least two storage units in which the target data set is stored.

* * * * *